United States Patent
Fukagawa et al.

(10) Patent No.: US 11,078,314 B2
(45) Date of Patent: Aug. 3, 2021

(54) FLUORINE-CONTAINING COPOLYMER, COMPOSITION FOR FORMING FILM, AND OPTICAL FILM

(71) Applicant: FUJIFILM Corporation, Tokyo (JP)

(72) Inventors: Reiko Fukagawa, Kanagawa (JP); Miho Asahi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/564,549

(22) Filed: Sep. 9, 2019

(65) Prior Publication Data

US 2019/0389989 A1  Dec. 26, 2019

Related U.S. Application Data

(63) Continuation of application No. PCT/JP2018/001016, filed on Jan. 16, 2018.

(30) Foreign Application Priority Data

Mar. 28, 2017 (JP) .............................. JP2017-063936

(51) Int. Cl.
  *C08F 214/18* (2006.01)
  *G02B 1/14* (2015.01)
  *C08J 5/18* (2006.01)
  *G02B 5/30* (2006.01)

(52) U.S. Cl.
  CPC ............. *C08F 214/184* (2013.01); *C08J 5/18* (2013.01); *G02B 1/14* (2015.01); *G02B 5/3025* (2013.01)

(58) Field of Classification Search
  USPC .................................. 526/246, 247, 248, 251
  See application file for complete search history.

(56) References Cited

U.S. PATENT DOCUMENTS

| | | | |
|---|---|---|---|
| 3,544,537 A * | 12/1970 | Brace ..................... | C08F 20/28 526/246 |
| 2004/0019176 A1 | 1/2004 | Araki et al. | |
| 2009/0081375 A1 | 3/2009 | Kakino | |
| 2010/0310875 A1 | 12/2010 | Hao et al. | |
| 2011/0026116 A1 | 2/2011 | Nishimura et al. | |

FOREIGN PATENT DOCUMENTS

| | | |
|---|---|---|
| JP | 10-221506 A | 8/1998 |
| JP | 2003-313242 A | 11/2003 |
| JP | 2008-106190 A | 5/2008 |
| JP | 2008-115329 A | 5/2008 |
| JP | 2008-169364 A | 7/2008 |
| JP | 2009-007488 A | 1/2009 |
| JP | 2009-096990 A | 5/2009 |
| JP | 2009-102513 A | 5/2009 |
| JP | 2011-031501 A | 2/2011 |
| JP | 2011-032352 A | 2/2011 |
| JP | 2011-508251 A | 3/2011 |
| JP | 2012-158720 A | 8/2012 |
| JP | 2013-049825 A | 3/2013 |
| JP | 2014-167081 A | 9/2014 |
| JP | 2015-067829 A | 4/2015 |
| JP | 2017-008128 A | 1/2017 |
| WO | 02/18457 A1 | 3/2002 |

OTHER PUBLICATIONS

Machine translation of Detailed Description of JP 2012-158720A, retrieved from ESPACENET on Sep. 29, 2020. (Year: 2012).*
Machine translation of Detailed Description of JP 2011-032352A, retrieved from ESPACENET on Sep. 29, 2020. (Year: 2020).*
Tan, et al, "Broadband antireflection film with moth-eye-like structure for flexible display applications," Journal of Optical Society of America, vol. 4, No. 7, 676-683, Jul. 2017. (Year: 2017).*
International Search Report Issued in PCT/JP2018/001016 dated Apr. 3, 2018.
Written Opinion Issued in PCT/JP2018/001016 dated Apr. 3, 2018.
International Preliminary Report on Patentability Issued in PCT/JP2018/001016 dated Oct. 1, 2019.

(Continued)

*Primary Examiner* — Fred M Teskin

(74) *Attorney, Agent, or Firm* — Edwards Neils LLC; Jean C. Edwards, Esq.

(57) ABSTRACT

A copolymer includes a repeating unit of Formula (I) and a repeating unit of Formula (II), a composition includes the copolymer, and an optical film has a layer formed of the composition,

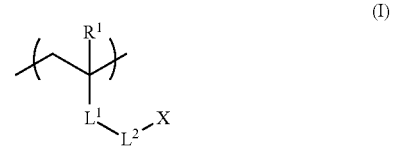

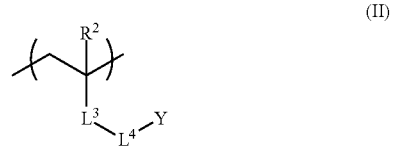

in the Formulae (I) and (II), $R^1$ and $R^2$ represent a hydrogen atom or an alkyl group, $L^3$ and $L^1$ represent a divalent linking group, $L^2$ represents a single bond or a divalent linking group, and $L^4$ represents a single bond or a divalent linking group, $L^4$ does not represent a linking group including —O(C=O)—NH—, X represents a perfluoropolyether group, an alkyl group having a branched structure in which hydrogen is all substituted into fluorine, an alkenyl group, or an alkynyl group, and Y represents a crosslinking group.

7 Claims, No Drawings

(56) References Cited

OTHER PUBLICATIONS

Office Action, issued by the Japanese Patent Office dated May 7, 2020, in connection with Japanese Patent Application No. 2019-508598.
Office Action, issued by the Japanese Patent Office dated Dec. 22, 2020, in connection with Japanese Patent Application No. 2019-508598.

* cited by examiner

FLUORINE-CONTAINING COPOLYMER, COMPOSITION FOR FORMING FILM, AND OPTICAL FILM

CROSS-REFERENCE TO RELATED APPLICATIONS

This application is a Continuation of PCT International Application No. PCT/JP2018/001016, filed on Jan. 16, 2018, which was published under PCT Article 21(2) in Japanese, and which claims priority under 35 U.S.C § 119 (a) to Japanese Patent Application No. 2017-063936, filed on Mar. 28, 2017. The above applications are hereby expressly incorporated by reference, in their entirety, into the present application.

BACKGROUND OF THE INVENTION

1. Field of the Invention

The present invention relates to a fluorine-containing copolymer, a composition for forming a film, and an optical film.

2. Description of the Related Art

Fluorine-containing copolymers can be used as a surface modifier of coated films.

For example, in an optical film having a functional layer on a base material (support), in a case where a fluorine-containing copolymer is added to a composition for forming the functional layer, at the time of applying the composition onto the support, it is possible to uniform the surface property of a coated film and impart an antifouling property through the action of the fluorine-containing copolymer.

In some cases, an optical film is disposed on the outermost surface of an image display device such as a display device in which a cathode-ray tube (CRT) is used, a plasma display panel (PDP), an electroluminescence display (ELD), a vacuum fluorescent display (VFD), a field emission display (FED), or a liquid crystal display (LCD), and, in such cases, the optical film is demanded to have a strong antifouling property to an oil and fat component such as a fingerprint or sebum and a high physical strength (rub resistance or the like).

For example, JP2014-167081A describes a compound having a long-chain perfluoropolyether chain and a polymerizable group. In addition, JP2017-008128A describes antifouling performance that is imparted using a fluorine-containing copolymer having a polymerizable unsaturated group.

SUMMARY OF THE INVENTION

However, according to the present inventors' studies, it was found that, in the case of forming a coated film using the fluorine-based compound described in JP2014-167081A or JP2017-008128A as an additive, the rub resistance lacks and both the antifouling property and the rub resistance are not sufficiently satisfied. In the technique of JP2017-008128A, it is considered that the reaction rate of the reaction of introducing a crosslinking group to the fluorine-containing copolymer is low, and the coating of the fluorine-containing copolymer does not sufficiently progress, and thus the fraction resistance is not sufficient.

In addition, recently, there has been a case where an antireflection film having a so-called moth eye structure is used, but the antireflection film having a moth eye structure has a protrusion and recess shape with a pitch that is equal to or shorter than the wavelength of visible light on the surface of a base material and is thus demanded to have a stronger antifouling property and stronger rub resistance.

In consideration of the above-described problem, an object of the present invention, that is, a problem to be solved by the present invention is to provide a fluorine-containing copolymer capable of forming a film that is excellent in terms of an antifouling property and rub resistance, a composition for forming a film that contains the fluorine-containing copolymer, and an optical film having a film that is formed of the composition for forming a film.

As a result of intensive studies for achieving the above-described object, the present inventors found that the use of a fluorine-containing copolymer having a fluorine-containing structure capable of further decreasing the surface free energy of the surface of a coated film and a crosslinking group is effective.

That is, it was found that the above-described object can be achieved by the following means.

<1> A fluorine-containing copolymer comprising: a repeating unit represented by General Formula (I); and a repeating unit represented by General Formula (II).

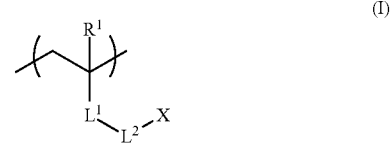

In General Formula (I), $R^1$ represents a hydrogen atom or an alkyl group having 1 to 20 carbon atoms. $L^1$ represents a divalent linking group including at least one selected from the group consisting of —O—, —(C=O)O—, —O(C=O)—, —(C=O)—NH—, —NH—(C=O)—, a divalent aromatic group, or a divalent alicyclic group, $L^2$ represents a single bond or a divalent linking group, and X represents a perfluoropolyether group, a perfluoroalkyl group having a branched structure, a perfluoroalkenyl group having a branched structure, or a perfluoroalkynyl group having a branched structure.

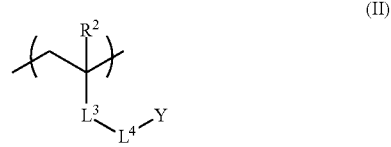

In General Formula (II), $R^2$ represents a hydrogen atom or an alkyl group having 1 to 20 carbon atoms, $L^3$ represents a divalent linking group including at least one selected from the group consisting of —O—, —(C=O)O—, —O(C=O)—, —(C=O)—NH—, —NH—(C=O)—, a divalent aromatic group, or a divalent alicyclic group. $L^4$ represents a single bond, an alkylene group having 1 to 20 carbon atoms, an alkenylene group having 1 to 20 carbon atoms, a divalent aromatic group, —O—. —(C=O)O—, —O(C=O)—, —(C=O)—NH—, —NH—(C=O)—, or a divalent linking group consisting of a combination of the above-described bond or groups. However, $L^4$ does not represent a linking group including —O(C=O)—NH—. Y represents a crosslinking group.

<2> The fluorine-containing copolymer according to <1>, in which Y in General Formula (II) is an acryloyloxy group, a methacryloyloxy group, or an acryloylamino group.

<3> The fluorine-containing copolymer according to <1> or <2>, in which the number of carbon atoms that are included in a group represented by X in General Formula (I) is 2 to 20.

<4> The fluorine-containing copolymer according to any one of <1> to <3>, in which X in General Formula (I) is represented by General Formula (III) or General Formula (IV).

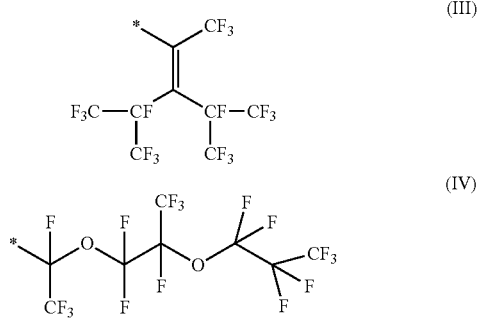

In General Formulae (III) and (IV), * represents a bonding site to $L^2$ in General Formula (I).

<5> The fluorine-containing copolymer according to any one of <1> to <4>, in which $L^1$ in General Formula (I) and $L^3$ in General Formula (II) each are represented by any of —(C=O)O—, —O(C=O)—, and —(C=O)—NH—.

The fluorine-containing copolymer according to any one of <1> to <4>, in which X in General Formula (I) is preferably represented a perfluoropolyether group, a perfluoroalkenyl group having a branched structure, or a perfluoroalkynyl group having a branched structure.

The fluorine-containing copolymer according to any one of <1> to <4>, in which an weight average molecular weight is preferably 1,000 to 100,000.

<6> A composition for forming a film comprising: the fluorine-containing copolymer according to any one of <1> to <5>.

<7> The composition for forming a film according to <6>, further comprising: a curable compound having a plurality of crosslinking groups in a molecule.

<8> The composition for forming a film according to <6> or <7>, further comprising: particles.

<9> An optical film comprising: a film that is formed of the composition for forming a film according to any one of <6> to <8>.

<10> An optical film comprising: a film that is formed of the composition for forming a film according to <8>, in which the optical film has a protrusion and recess structure on a surface.

According to the present invention, it is possible to provide a fluorine-containing copolymer capable of forming a film that is excellent in terms of an antifouling property and rub resistance, a composition for forming a film that contains the fluorine-containing copolymer, and an optical film having a film that is formed of the composition for forming a film.

DESCRIPTION OF THE PREFERRED EMBODIMENTS

Hereinafter, the present invention will be described in detail.

Meanwhile, in the present specification, numerical ranges expressed using "to" include numerical values before and after "to" as the upper limit value and the lower limit value.

In the present specification, "(meth)acrylic groups" refer to "acrylic groups or/and methacrylic groups". What has been described above is also true to (meth)acrylate, (meth)acrylamide, (meth)acryloyl groups, and the like.

[Fluorine-Containing Copolymer]

A fluorine-containing copolymer of an embodiment of the present invention is a copolymer including a repeating unit represented by General Formula (I) and a repeating unit represented by General Formula (II).

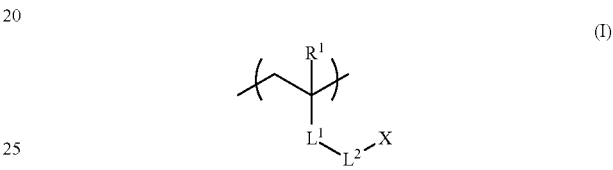

In General Formula (I), $R^1$ represents a hydrogen atom or an alkyl group having 1 to 20 carbon atoms, $L^1$ represents a divalent linking group including at least one selected from the group consisting of —O—, —(C=O)O—, —O(C=O)—, —(C=O)—NH—, —NH—(C=O)—, a divalent aromatic group, or a divalent alicyclic group. $L^2$ represents a single bond or a divalent linking group, and X represents a perfluoropolyether group, a perfluoroalkyl group having a branched structure, a perfluoroalkenyl group having a branched structure, or a perfluoroalkynyl group having a branched structure.

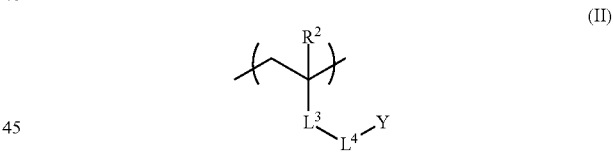

In General Formula (II), $R^2$ represents a hydrogen atom or an alkyl group having 1 to 20 carbon atoms, $L^3$ represents a divalent linking group including at least one selected from the group consisting of —O—, —(C=O)O—, —O(C=O)—, —(C=O)—NH—, —NH—(C=O)—, a divalent aromatic group, or a divalent alicyclic group, $L^4$ represents a single bond, an alkylene group having 1 to 20 carbon atoms, an alkenylene group having 1 to 20 carbon atoms, a divalent aromatic group, —O—, —(C=O)O—, —O(C=O)—. —(C=O)—NH—, —NH—(C=O)—, or a divalent linking group consisting of a combination of the above-described bond or groups. However, $L^4$ does not represent a linking group including —O(C=O)—NH—. Y represents a crosslinking group.

In the case of being contained in a coated film, the fluorine-containing copolymer of the embodiment of the present invention is locally present on the surface due to an effect of a fluorine-containing group and is capable of improving a levelling property by decreasing the surface energy of the coated film. Furthermore, in the case of having a group represented by X that is a specific structure as the fluorine-containing group, the fluorine-containing copolymer is capable of improving the fingerprint wiping property by weakening the fingerprint attachment property even in a coated film having a protrusion and recess shape on the surface and is thus capable of providing a favorable antifouling property to the coated film. In addition, the fluorine-containing copolymer has a number of crosslinking groups represented by Y in the molecule and is thus capable of providing excellent rub resistance to a coated film by improving the surface strength of the coated film. Particularly, in the case of using an optical film having a fine protrusion and recess structure on the surface, it is possible to exhibit a high level of an antifouling property and rub resistance that cannot be obtained in the related art.

The repeating unit represented by General Formula (I) will be described.

General Formula (I) is a repeating unit derived from a fluorine-containing monomer.

$R^1$ in General Formula (I) represents a hydrogen atom or an alkyl group having 1 to 20 carbon atoms and is preferably a hydrogen atom or an alkyl group having 1 to 10 carbon atoms, more preferably a hydrogen atom or an alkyl group having 1 to 4 carbon atoms, and still more preferably a hydrogen atom or a methyl group.

$L^1$ in General Formula (I) represents a divalent linking group including at least one selected from the group consisting of —O—, —(C=O)O—, —O(C=O)—, —(C=O)—NH—, —NH—(C=O)—, a divalent aromatic group, or a divalent alicyclic group. Meanwhile, —(C=O)O— indicates that a carbon atom to which $R^1$ bonds and C=O bond to each other and $L^2$ and O bond to each other, —O(C=O)— indicates that a carbon atom to which $R^1$ bonds and O bond to each other and $L^2$ and C=O bond to each other, —(C=O)—NH— indicates that a carbon atom to which $R^1$ bonds and C=O bond to each other and $L^2$ and NH bond to each other, and —NH—(C=O)— indicates that a carbon atom to which $R^1$ bonds and NH bond to each other and $L^2$ and C=O bond to each other.

The divalent aromatic group is preferably an aromatic group having 6 to 20 carbon atoms and more preferably a phenyl group.

The divalent alicyclic group is preferably a cycloalkylene group having 3 to 20 carbon atoms and more preferably a cycloalkylene group having 3 to 15 carbon atoms.

$L^1$ is preferably —(C=O)O—, —O(C=O)—, —(C=O)—NH—, or a divalent aromatic group, more preferably —(C=O)O—, —O(C=O)—, or —(C=O)—NH—, and still more preferably —(C=O)O—.

$L^2$ in General Formula (I) represents a single bond or a divalent linking group.

In a case where $L^2$ represents a divalent linking group, the divalent linking group may have a branched structure or a cyclic structure.

As the divalent linking group, an alkylene group having 1 to 20 carbon atoms (which may be linear, branched, or cyclic), an alkenylene group having 1 to 20 carbon atoms (which may be linear, branched, or cyclic), —O—, —(C=O)—NH—, —NH—(C=O)—. —(C=O)O—, —O(C=O)—, or a divalent linking group consisting of a combination of the above-described groups are exemplified. Meanwhile, —(C=O)—NH—, —NH—(C=O)—, —(C=O)O—, and —O(C=O)— indicate that the divalent linking group bonds with C=O in —(C=O)—NH—, NH in —NH—(C=O)—, C=O in —(C=O)O—, or O in —O(C=O)— located closer to $L^1$ in the divalent linking group and the divalent linking group bonds with NH in —(C=O)—NH—, C=O in —NH—(C=O)—, O in —(C=O)O—, or C=O in —O(C=O)— located closer to X in the divalent linking group.

In a case where $L^2$ represents a divalent linking group, the divalent linking group may further have a substituent, and, as the substituent, a hydroxyl group, a halogen group, an amino group, a carboxyl group, a perfluoropolyether group, a perfluoroalkyl group, a perfluoroalkenyl group, and a perfluoroalkynyl group are preferably exemplified. As the perfluoropolyether group, the perfluoroalkyl group, the perfluoroalkenyl group, and the perfluoroalkynyl group, the same groups as X described below are preferred.

From the viewpoint of easiness in manufacturing and the effective development of an antifouling property, $L^2$ is preferably an alkylene group having 1 to 10 carbon atoms, —O—, —(C=O)O—, —O(C=O)—, or a divalent linking group consisting of a combination of the above-described group and more preferably an alkylene group having 1 to 4 carbon atoms, —O—, —(C=O)O—, —O(C=O)—, or a divalent linking group consisting of a combination of the above-described group. In a case where the structure of $L^2$ is formed as described above, it is possible to provide a more favorable solubility in a solvent and more easily manufacture $L^2$.

The number of carbon atoms that are included in $L^2$ is preferably 1 to 30, more preferably 1 to 20, and still more preferably 1 to 10. In a case where the number of carbon atoms in $L^2$ is in the above-described range, a fluorine group is efficiently introduced to the copolymer, and the antifouling property can be improved.

In General Formula (I), X represents a perfluoropolyether group, a perfluoroalkyl group having a branched structure, a perfluoroalkenyl group having a branched structure, or a perfluoroalkynyl group having a branched structure.

Meanwhile, the branched structure in X refers to a structure having a side chain including one or more carbon atoms in a case where the longest chain including a carbon atom in X is regarded as the main chain.

In the fluorine-containing copolymer of the embodiment of the present invention, it is assumed that, compared with a perfluoroalkyl-based compound that is used as a levelling agent in the related art due to the fact that X has an ether structure or a branched structure, the surface free energy to the surface of a coated film to be formed is smaller and fluorine atoms are densely present, and thus the antifouling property improves.

X is preferably a perfluoropolyether group having 2 to 20 carbon atoms, a perfluoroalkyl group having a branched structure with 2 to 20 carbon atoms, a perfluoroalkenyl group having a branched structure with 2 to 20 carbon atoms, or a perfluoroalkynyl group having a branched structure with 2 to 20 carbon atoms.

X is more preferably a perfluoropolyether group having 2 to 10 carbon atoms, a perfluoroalkyl group having a branched structure with 2 to 10 carbon atoms, a perfluoroalkenyl group having a branched structure with 2 to 10 carbon atoms, or a perfluoroalkynyl group having a branched structure with 2 to 10 carbon atoms.

In General Formula (I), X is preferably a structure represented by General Formula (III) or General Formula (IV) from the viewpoint of easiness in manufacturing.

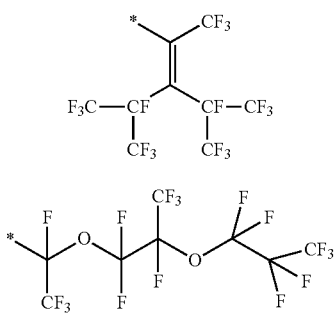

(III)

(IV)

In General Formulae (III) and (IV), * represents a bonding site to $L^2$ in General Formula (I).

The repeating unit represented by General Formula (I) is particularly preferably a repeating unit represented by General Formula (I-III) or (I-IV).

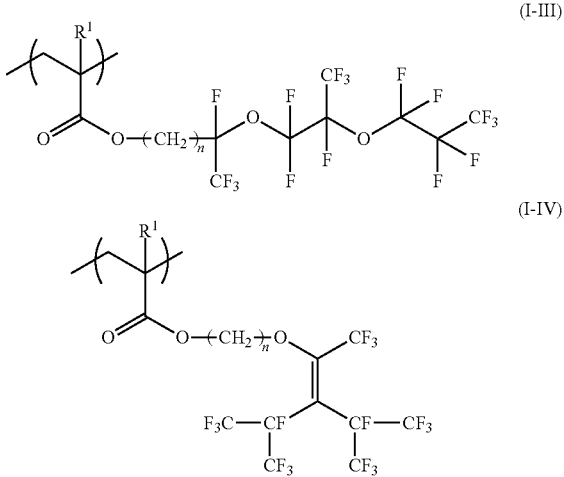

(I-III)

(I-IV)

In General Formulae (I-III) and (1-IV), n represents an integer of 1 to 10, preferably represents an integer of 1 to 5, and more preferably represents 1 or 2.

$R^1$ is identical to $R^1$ in General Formula (I), and a preferred range thereof is also identical thereto.

Next, General Formula (II) will be described. General Formula (II) is a repeating unit having a crosslinking group (Y).

$R^2$ in General Formula (II) represents a hydrogen atom or an alkyl group having 1 to 20 carbon atoms and is preferably a hydrogen atom or an alkyl group having 1 to 10 carbon atoms, more preferably a hydrogen atom or an alkyl group having 1 to 4 carbon atoms, and still more preferably a hydrogen atom or a methyl group.

In General Formula (II), $L^3$ represents a divalent linking group including at least one selected from the group consisting of —O—, —(C=O)O—, —O(C=O)—, —(C=O)—NH—, —NH—(C=O)—, a divalent aromatic group, or a divalent alicyclic group. Meanwhile, —(C=O)O— indicates that a carbon atom to which $R^2$ bonds and C=O bond to each other and $L^4$ and O bond to each other, —O(C=O)— indicates that a carbon atom to which $R^2$ bonds and O bond to each other and $L^4$ and C=O bond to each other, —(C=O)—NH— indicates that a carbon atom to which $R^2$ bonds and C=O bond to each other and $L^4$ and NH bond to each other, and —NH—(C=O)— indicates that a carbon atom to which $R^2$ bonds and NH bond to each other and $L^4$ and C=O bond to each other.

The divalent aromatic group is preferably an aromatic cyclic group having 6 to 20 carbon atoms and more preferably a phenyl group.

The divalent alicyclic group is preferably a cycloalkylene group having 3 to 20 carbon atoms and more preferably a cycloalkylene group having 3 to 15 carbon atoms.

$L^3$ is preferably —(C=O)O—, —O(C=O)—, —(C=O)—NH—, or a divalent aromatic group, more preferably —(C=O)O—, —O(C=O)—, or —(C=O)—NH—, and still more preferably —(C=O)O—.

In General Formula (II), $L^4$ represents a single bond, an alkylene group having 1 to 20 carbon atoms (which may be linear, branched, or cyclic), an alkenylene group having 1 to 20 carbon atoms (which may be linear, branched, or cyclic), a divalent aromatic group (which is preferably an aromatic group having 6 to 20 carbon atoms and more preferably a phenylene group), —O—, —(C=O)O—, —O(C=O)—, —(C=O)—NH—, —NH—(C=O)—, or a divalent linking group consisting of a combination of the above-described bond or groups. However, $L^4$ does not represent a linking group including —O(C=O)—NH—. Meanwhile, —(C=O)O—, —O(C=O)—, —(C=O)—NH—, and —NH—(C=O)— indicate that the divalent linking group bonds with C=O in —(C=O)O—, O in —O(C=O)—, C=O in —(C=O)—NH—, and NH in —NH—(C=O)— located closer to $L^3$ in the divalent linking group and the divalent linking group bonds with O in —(C=O)O—, C=O in —O(C=O)—, NH in —(C=O)—NH—, and C=O in —NH—(C=O)— located closer to Y in the divalent linking group.

In a case where $L^4$ represents a divalent linking group, the divalent linking group may further have a substituent, and, as the substituent, a hydroxyl group, a halogen group, an amino group, a carboxyl group, and a crosslinking group are preferably exemplified. As the crosslinking group, the same groups as Y described below are preferred.

$L^4$ is preferably an alkylene group, —O—, —(C=O)O—, —O(C=O)—, or a divalent linking group consisting of a combination of the above-described bond or groups and more preferably an alkylene group.

The number of carbon atoms that are included in $L^4$ is preferably 1 to 30, more preferably 1 to 20, and still more preferably 2 to 10.

$L^4$ is preferably not a linking group including —NH—(C=O)O—. The reason therefor is considered that the linking group including —NH—(C=O)O— can be manufactured by, for example, reacting a compound including a hydroxy group and a crosslinking group with a copolymer of a precursor including an isocyanate group; however, in this case, the modification ratio of the crosslinking group (the proportion of the crosslinking group that is introduced to the copolymer) becomes low.

Meanwhile, $L^4$ does not represent a linking group having —O(C=O)—NH—. The reason therefor is that a structure having a linking group including —O(C=O)—NH— can be manufactured by, for example, reacting a compound including a crosslinking group and an isocyanate group with a copolymer of a precursor including a hydroxyl group or the like; however, in this case, the modification ratio of the crosslinking group (the proportion of the crosslinking group that is introduced to the copolymer) becomes low. Therefore, the obtained copolymer is not sufficiently coated, and the rub resistance becomes poor.

In General Formula (II). Y represents a crosslinking group. The crosslinking group may have any structure as long as the crosslinking group is a functional group that can be cross-linked by the stimulation of light, a radioactive ray, heat, pH, an ultrasonic wave, or the like.

Y is preferably a group having an ethylenic unsaturated group such as an acryloyloxy group, a methacryloyloxy group, an acryloylamino group, a methacryloylamino group, a vinyl group, an allyl group, or a vinyl ester group or an oxacycloalkane group such as an epoxy group or an oxetane group, more preferably an acryloyloxy group, a methacryloyloxy group, or an acryloylamino group, and still more preferably an acryloyloxy group or a methacryloyloxy group.

The repeating unit represented by General Formula (II) is particularly preferably a repeating unit represented by General Formula (II-2).

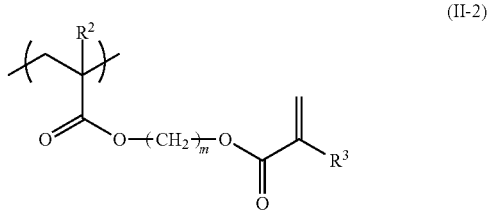

(II-2)

In General Formula (II-2), $R^3$ represents a hydrogen atom or a methyl group. m represents an integer of 2 to 10 and preferably represents an integer of 2 to 5.

$R^2$ is identical to $R^2$ in General Formula (II), and a preferred range thereof is also identical thereto.

The fluorine-containing copolymer of the embodiment of the present invention may also have other repeating units other than the repeating unit represented by General Formula (I) and the repeating unit represented by General Formula (II). As the other repeating units, random repeating units are exemplified, and it is possible to use a repeating unit derived from an all-purpose monomer.

The compositional ratio (molar ratio) of the repeating unit represented by General Formula (I) to the repeating unit represented by General Formula (II) in the fluorine-containing copolymer of the embodiment of the present invention is preferably 5/95 to 95/5, more preferably 10/90 to 80/20, and most preferably 20/80 to 55/45 (the repeating unit represented by General Formula (I), the repeating unit represented by General Formula (II)). In the case of setting the compositional ratio in the above-described range, it is possible to better the solubility of the fluorine-containing copolymer of the embodiment of the present invention in a solvent, and it is also possible to improve the rub resistance and the antifouling property of a film formed of a composition for forming a film including the fluorine-containing copolymer of the embodiment of the present invention.

In a case where the fluorine-containing copolymer of the embodiment of the present invention has the other repeating units other than the repeating unit represented by General Formula (I) and the repeating unit represented by General Formula (II), the other repeating units can be introduced in a random proportion in order to improve or adjust a variety of performances of the fluorine-containing copolymer other than the rub resistance and the antifouling property.

The weight-average molecular weight (Mw) of the fluorine-containing copolymer of the embodiment of the present invention is preferably 1,000 to 200,000, more preferably 5,000 to 100,000, and particularly preferably 10,000 to 80,000. In the case of setting Mw in the above-described range, at the time of forming a film using a composition for forming a film including the fluorine-containing copolymer of the embodiment of the present invention, a crosslinking reaction efficiently proceeds, the strength of the film surface can be increased, and a favorable rub resistance can be obtained.

The dispersion degree (Mw/Mn) of the fluorine-containing copolymer of the present invention is preferably 1.00 to 12.00, more preferably 1.30 to 10.00, and still more preferably 1.50 to 8.00. Mn represents the number-average molecular weight.

Meanwhile, the weight-average molecular weight and the number-average molecular weight are values measured by means of gel permeation chromatography (GPC) under the following conditions.

[Eluent] Tetrahydrofuran (THF)
[Instrument name] EcoSEC HLC-8320GPC (manufactured by Tosoh Corporation)
[Column] TSKgel SuperHZM-H, TSKgel SuperHZ4000, TSKgel SuperHZ200 (manufactured by Tosoh Corporation)
[Column temperature] 40° C.
[Flow rate] 0.35 ml/min The fluorine content rate of the fluorine-containing copolymer of the embodiment of the present invention is preferably 5% or more and 80% or less and more preferably 10% or more and 60% or less. In a case where the fluorine content rate is set in the above-described range, it is possible to obtain a coated film having a favorable solubility in a coating solvent and a strong antifouling property.

The fluorine content rate in the copolymer can be computed by multiplying (the proportion of a fluorine atom in the total mass of a repeating unit having a fluorine atom) by (the proportion of the repeating unit having a fluorine atom in the copolymer).

The fluorine-containing copolymer of the embodiment of the present invention can be obtained by, for example, radical-polymerizing a monomer corresponding to the repeating unit represented by General Formula (I) and a monomer corresponding to the repeating unit represented by General Formula (II), but is preferably manufactured by preparing a precursor polymer of the fluorine-containing copolymer that has an organic group represented by X in General Formula (I) and does not have a crosslinking group represented by Y in General Formula (II) in a side chain and introducing a crosslinking group Y to this precursor polymer.

The fluorine-containing copolymer or the precursor polymer thereof can be prepared using a well-known method. Examples thereof include a solution polymerization method, a suspension polymerization method, an emulsification polymerization method, a melt polymerization method, and the like, and the fluorine-containing copolymer or the precursor polymer thereof is preferably prepared using, among these, a solution polymerization method.

As a method for introducing the crosslinking group Y, the following methods (1) to (5) are preferred. Meanwhile, in the methods (1) to (5), a case where a (meth)acryloyl group is used as the crosslinking group Y will be exemplified, but the crosslinking group Y is not limited to a (meth)acryloyl group.

(1) A method in which a precursor polymer having a nucleophilic group such as a hydroxy group or an amino group in a side chain is synthesized and then (meth)acrylic acid chloride, (meth)acrylic acid anhydride, an anhydride of an acid mixture of (meth)acrylic acid and methanesulfonic acid, or the like is caused to act, (2) a method in which (meth)acrylic acid is caused to act on the precursor polymer having a nucleophilic group in the presence of a catalyst such as sulfuric acid, (3) a method in which a precursor polymer having an epoxy group is synthesized and then (meth)acrylic acid is caused to act, (4) a method in which a compound having both an epoxy group and a (meth)acryloyl group such as glycidyl methacrylate is caused to act to a precursor polymer having a carboxyl group, and (5) a method in which a precursor polymer is obtained using a vinyl monomer having an alpha or beta-haloester group and then dehydrogenation is carried out.

Among these, particularly, the crosslinking group is preferably introduced using the method (5).

Specific examples of the fluorine-containing copolymer of the embodiment of the present invention will be shown, but the present invention is not limited thereto. Meanwhile, in the following specific examples, the compositional ratios of individual repeating units represent molar ratios.

B-1

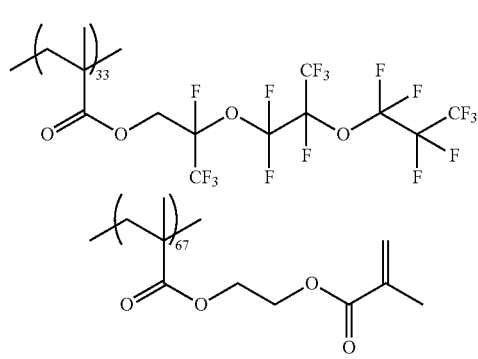

Mw = 15,800

B-2

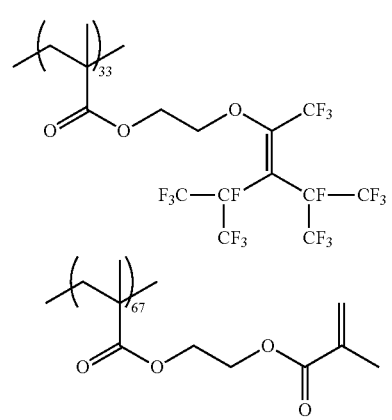

Mw = 16,200

B-3

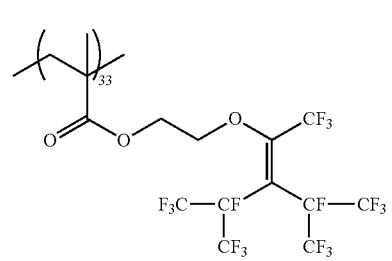

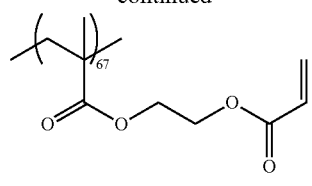

Mw = 12,300

B-4

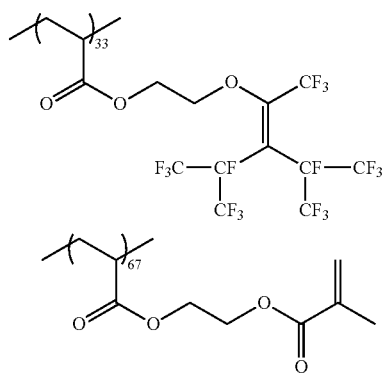

Mw = 33,900

B-5

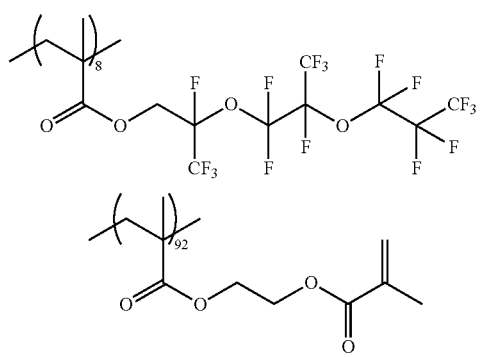

Mw = 25,000

B-6

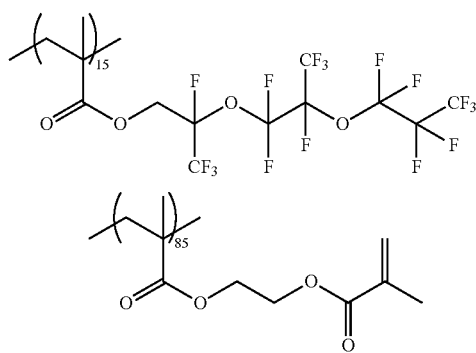

Mw = 68,600

B-7

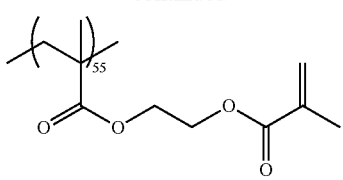
Mw = 10,500
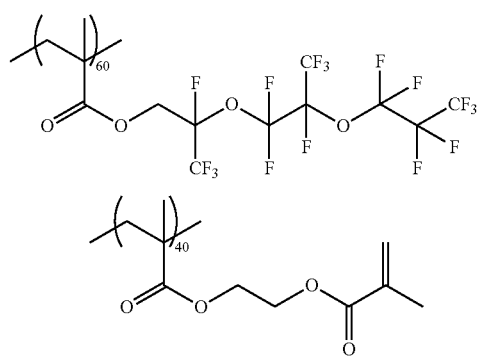
Mw = 11,300
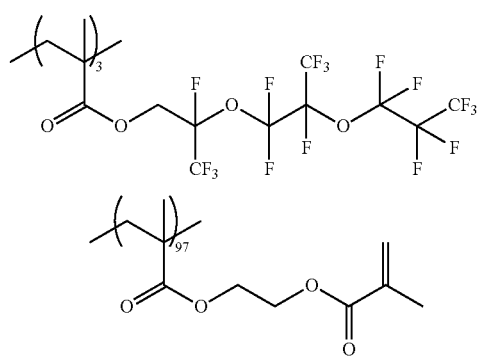
Mw = 16,900
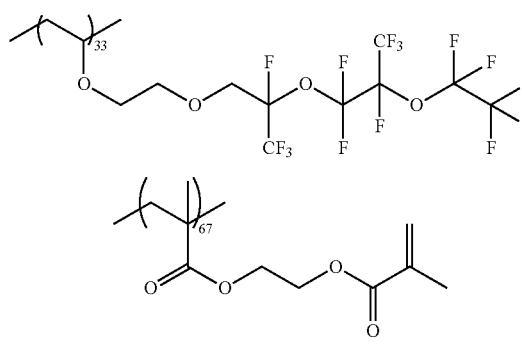
Mw = 20,200
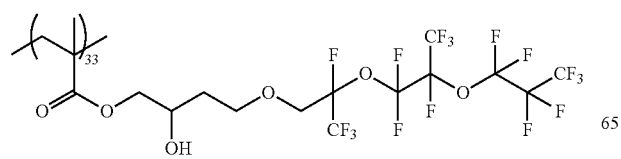
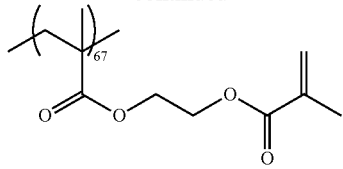
Mw = 36,500
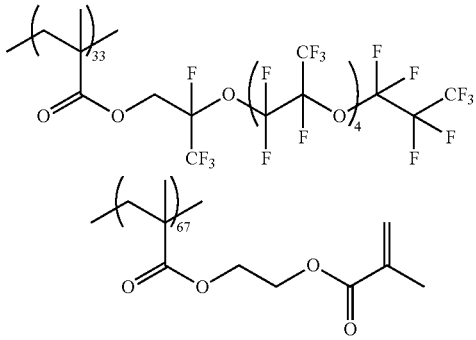
Mw = 14,400
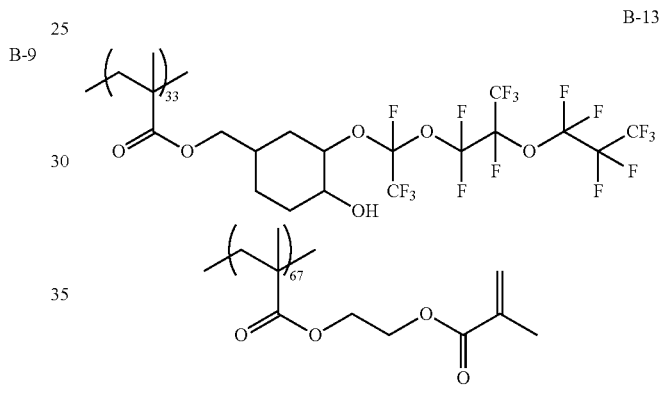
Mw = 29,900
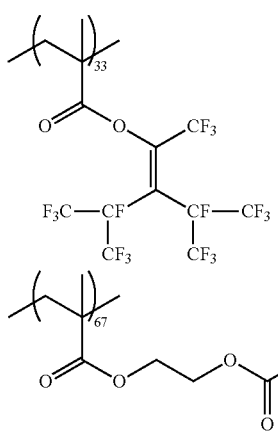
Mw = 14,900
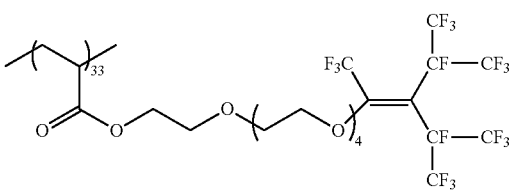

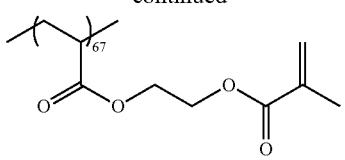
Mw = 18,300
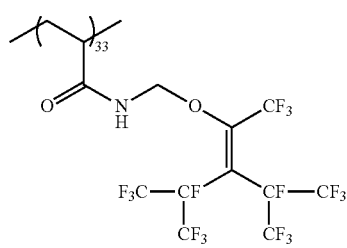
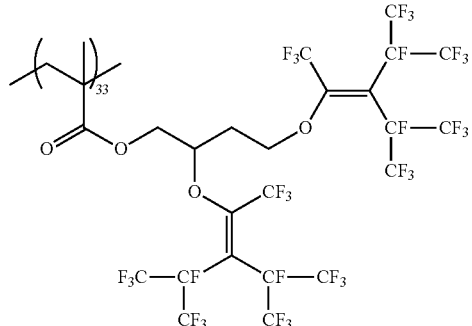
Mw = 19,600
B-17
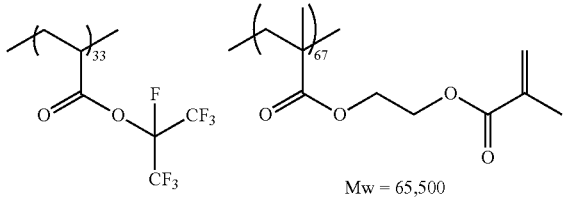
Mw = 22,300
B-18
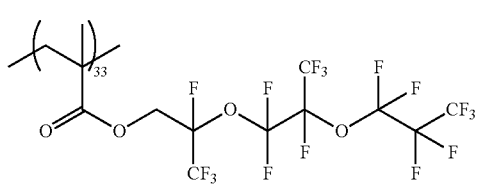
Mw = 65,500
B-19
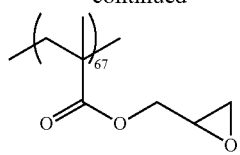
Mw = 15,300
B-20
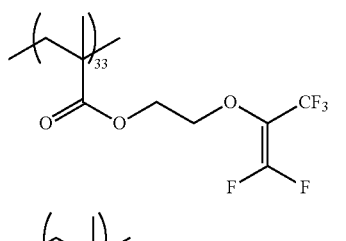
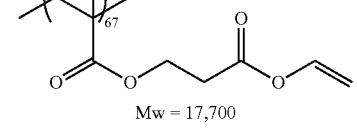
Mw = 17,700
B-21
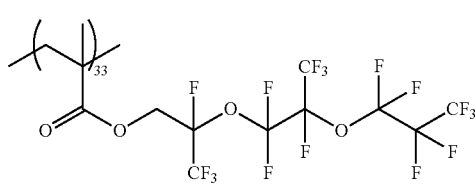
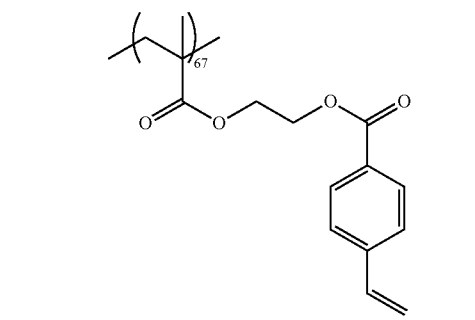
Mw = 19,000
B-22
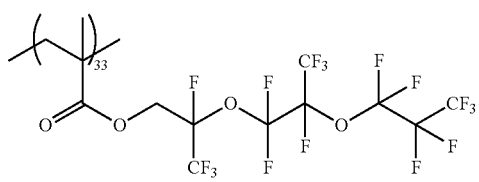
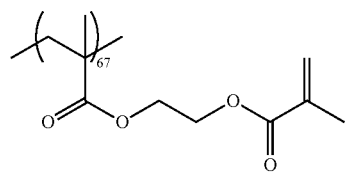
Mw = 2,200

-continued
B-23
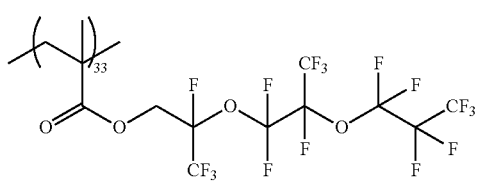
Mw = 6,700
B-24
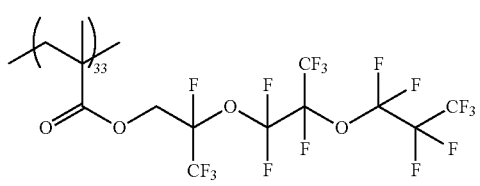
Mw = 158,100
B-25
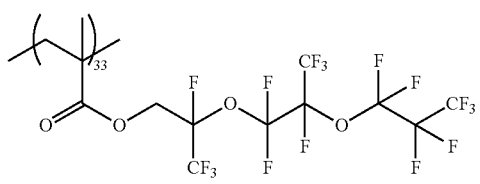
Mw = 14,600
B-26
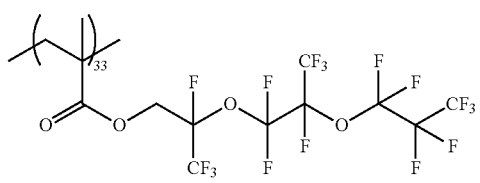
Mw = 23,800
-continued
B-27
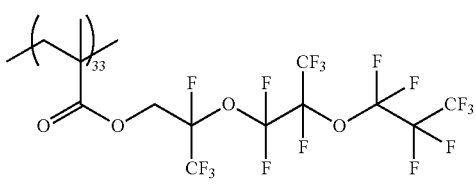
Mw = 11,200
B-28
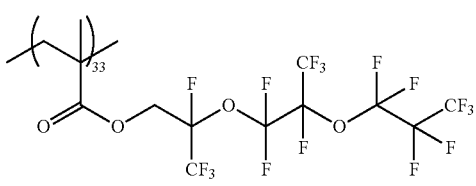
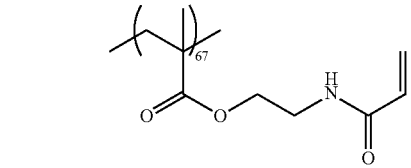
Mw = 16,400
B-29
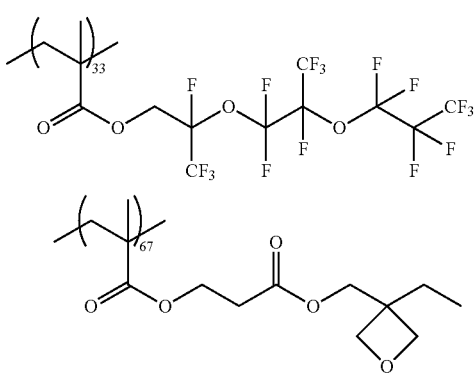
Mw = 44,700
B-30
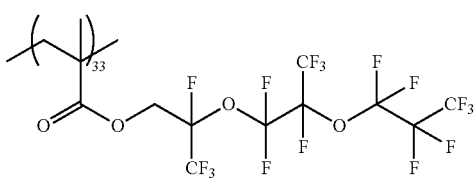
Mw = 78,800

-continued
B-31
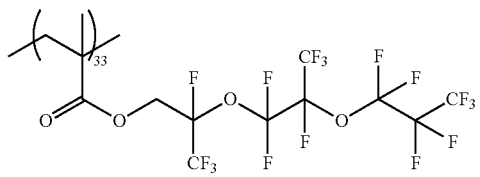
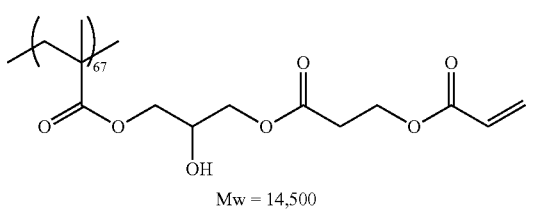
Mw = 14,500
B-32
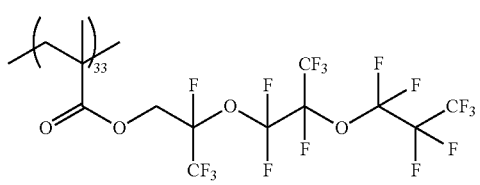
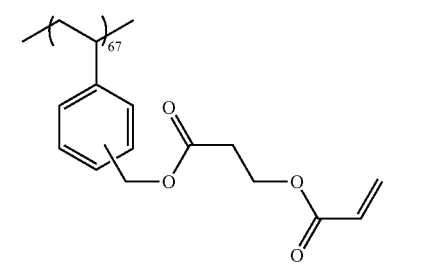
Mw = 66,500
B-33
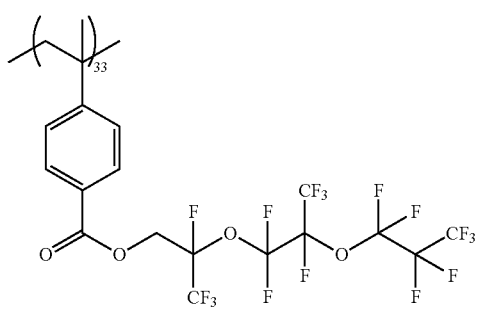
Mw = 15,200
B-34
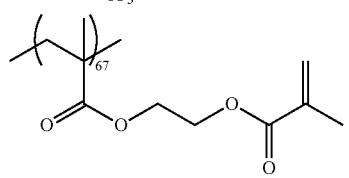
-continued
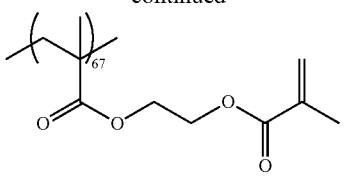
Mw = 44,700
B-35
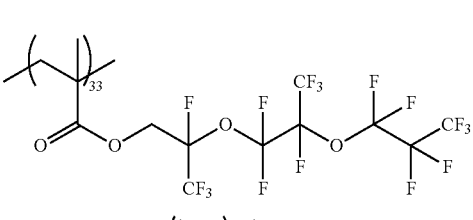
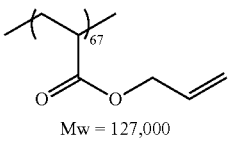
Mw = 127,000
B-36
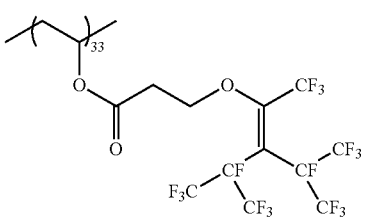
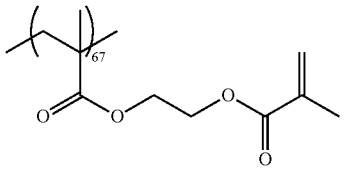
Mw = 45,100
B-37
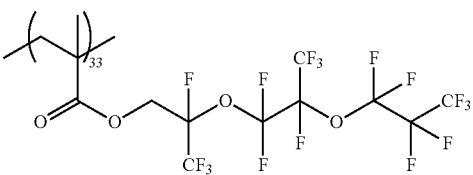
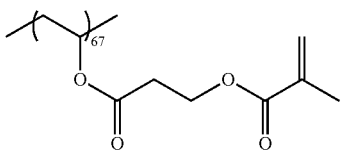
Mw = 22,100
B-38
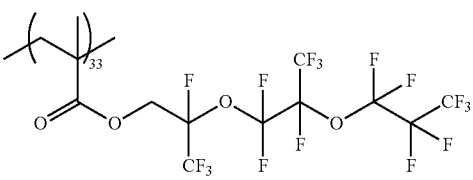

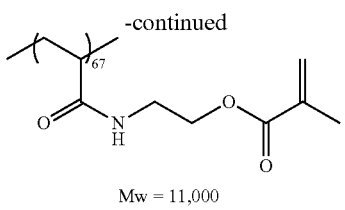

Mw = 11,000

[Composition for Forming Film]

Next, a composition for forming a film of an embodiment of the present invention will be described.

The composition for forming a film of the embodiment of the present invention includes the fluorine-containing copolymer of the embodiment of the present invention. The content of the fluorine-containing copolymer of the embodiment of the present invention is preferably 0.01% to 5.0% by mass and more preferably 0.1% to 2.0% by mass in a case where the all solid contents of the composition for forming a film (all components except for a solvent) is set to 100% by mass.

The composition for forming a film of the embodiment of the present invention may contain a component other than the fluorine-containing copolymer of the embodiment of the present invention and preferably contains a compound for forming a film and a solvent in addition to the fluorine-containing polymer. Particularly, the composition preferably contains a curable compound having a plurality of crosslinking groups in the molecule as the compound for forming a film.

[Curable Compound Having a Plurality of Crosslinking Groups in Molecule]

As the curable compound having a plurality of crosslinking groups in the molecule (hereinafter, also referred to as "the curable compound" in some cases), it is possible to use a variety of monomers, oligomers, or polymers, and, as the crosslinking group (polymerizable functional group), a light, electron beam, or radioactive ray-polymerizable functional group is preferred, and, particularly, a light-polymerizable functional group is preferred.

As the light-polymerizable functional group, a polymerizable unsaturated group (carbon-carbon unsaturated double bond group) such as a (meth)acryloyl group, a vinyl group, a styryl group, or an allyl group and the like are exemplified, and, among these, a (meth)acryloyl group is preferred.

As specific examples of the compound having a polymerizable unsaturated group, (meth)acrylic acid diesters of an alkylene glycol such as neopentyl glycol acrylate, 1,6-hexanediol (meth)acrylate, and propylene glycol di(meth)acrylate:

(meth)acrylic acid diesters of a polyoxyalkylene glycol such as triethylene glycol di(meth)acrylate, dipropylene glycol di(meth)acrylate, polyethylene glycol di(meth)acrylate, and polypropylene glycol di(meth)acrylate;

(meth)acrylic acid diesters of a polyhydric alcohol such as pentaerythritol di(meth)acrylate;

(meth)acrylic acid diesters of an ethylene oxide or a propylene oxide adduct such as 2,2-bis{4-(acryloxy-diethoxy)phenyl}propane and 2-2-bis{4-(acryloxy-polypropoxy)phenyl}propane; and the like can be exemplified.

Furthermore, (meth)acrylates, urethane (meth)acrylates, and polyester (meth)acrylates are also preferably used as the compound having a polymerizable unsaturated group.

Among these, esters of a polyhydric alcohol and a (meth) acrylic acid are preferred. More preferably, the esters preferably have at least one polyfunctional monomer having three or more (meth)acryloyl groups in a molecule.

Examples thereof include esters of a polyhydric alcohol and a (meth)acrylic acid {for example, pentaerythritol tetra (meth)acrylate, pentaerythritol tri(meth)acrylate, trimethylolpropane tri(meth)acrylate, ethylene oxide (EO)-modified trimethylolpropane tri(meth)acrylate, propylene oxide (PO)-modified trimethylolpropane tri(meth)acrylate, EO-modified phosphoric tri(meth)acrylate, trimethylolethane tri (meth)acrylate, ditrimethylolpropane tetra(meth)acrylate, dipentaerythritol tetra(meth)acrylate, dipentaerythritol penta (meth)acrylate, dipentaerythritol hexa(meth)acrylate, pentaerythritol hexa(meth)acrylate, 1,2,3-cyclohexane tetramethacrylate, polyurethane polyacrylate, polyester polyacrylate, caprolactone-modified tris(acryloyloxyethyl) isocyanurate, and the like.

The curable compound may be used singly, and it is also possible to use a plurality of curable compounds in combination.

The content of the curable compound is preferably 30% to 80% by mass and more preferably 40% to 70% by mass in a case where the all solid contents of the composition for forming a film (all components except for a solvent) is set to 100% by mass.

[Solvent]

The composition for forming a film may contain a solvent. As the solvent, a variety of organic solvents can be used in consideration of the solubility of the fluorine-containing copolymer of the embodiment of the present invention or a curable compound, the drying property during coating, and the like. Examples of the organic solvents include methyl alcohols such as dibutyl ether, dimethoxyethane, diethoxyethane, propylene oxide, 1,4-dioxane, 1,3-dioxolane, 1,3,5-trioxane, tetrahydrofuran, anisole, phenetol, dimethyl carbonate, methylethyl carbonate, diethyl carbonate, acetone, methyl ethyl ketone (MEK), diethyl ketone, dipropyl ketone, diisobutyl ketone, cyclopentanone, cyclohexanone, methylcyclohexanone, ethyl formate, propyl formate, pentyl formate, methyl acetate, ethyl acetate, propyl acetate, methyl propionate, ethyl propionate, γ-butyrolactone, methyl 2-methoxyacetate, methyl 2-ethoxyacetate, ethyl 2-ethoxyacetate, ethyl 2-ethoxypropionate, 2-methoxyethanol, 2-propoxyethanol, 2-butoxyethanol, 1,2-diacetoxyacetone, acetylacetone, diacetone alcohol, methyl acetoacetate, and ethyl acetoacetate, ethyl alcohol, isopropyl alcohol, n-butyl alcohol, cyclohexyl alcohol, isobutyl acetate, methyl isobutyl ketone (MIBK), 2-octanone, 2-pentanone, 2-hexanone, ethylene glycol ethyl ether, ethylene glycol isopropyl ether, ethylene glycol butyl ether, propylene glycol methyl ether, ethyl carbitol, butyl carbitol, hexane, heptane, octane, cyclohexane, methylcyclohexane, ethylcyclohexane, benzene, toluene, xylene, methanol, ethanol, tert-butyl alcohol, propylene glycol monomethyl ether acetate, and the like, and one kind of solvent may be singly used or two or more kinds of solvents may be used in combination.

The solvent is used so that the concentration of the solid content of the composition for forming a film of the embodiment of the present invention is in a range of preferably 5% to 80% by mass, more preferably 10% to 75% by mass, and still more preferably 15% to 70% by mass.

The composition for forming a film may also include an additive such as a polymerization initiator in addition to the above-described components. The polymerization initiator may be used singly or two or more polymerization initiators may be used in combination.

[Radical Polymerization Initiator]

The composition for forming a film of the embodiment of the present invention may contain a radical polymerization initiator.

The compound having an ethylenic unsaturated bond can be polymerized by irradiation with ionizing radiation or heating in the presence of a photoradical polymerization initiator or a thermoradical polymerization initiator. As the photo- and thermo polymerization initiator, commercially available compounds can be used, and the commercially available compounds are described in "Advanced UV curing techniques" (p. 159, publisher: Kazuhiro Takasu, publishing company: Technical Information Institute Co., Ltd., published on 1991) or BASF's catalogues.

In a case where the total solid content of the composition for forming a film of the embodiment of the present invention is set to 100% by mass, the amount of the radical polymerization initiator added is preferably in a range of 0.1% to 10% by mass and more preferably 1% to 5% by mass.

[Optical Film]

An optical film of the embodiment of the present invention has a film that is formed of the composition for forming a film of the embodiment of the present invention.

The optical film preferably has a film that is formed of the composition for forming a film on a base material.

The film that is formed of the composition for forming a film of the embodiment of the present invention is a film that is excellent in terms of an antifouling property and rub resistance, but it is possible to produce the film as, for example, a functional layer such as an antireflection layer by further including a component for imparting another function in the composition for forming a film.

Particularly, the fluorine-containing copolymer of the embodiment of the present invention is capable of imparting a more favorable antifouling property and more favorable rub resistance than fluorine-containing compounds of the related art and thus can be preferably used at the time of forming an optical film having a protrusion and recess structure on the surface, for example, an antireflection layer in an antireflection film having a moth eye structure. In this case, the antireflection layer can also be formed using a composition for forming a film containing the fluorine-containing copolymer of the embodiment of the present invention and particles. Hereinafter, the moth eye structure and the particles will be described.

(Moth Eye Structure)

A moth eye structure refers to a structure having a cyclic fine structural pattern on a worked surface of a substance (material) for suppressing the reflection of light. Particularly, in the case of intending to suppress the reflection of visible light, the moth eye structure refers to a structure having a fine structural pattern with a cycle of less than 780 nm. In a case where the cycle of the fine structural pattern is less than 380 nm, the hue of the reflected light fades, which is preferable. In addition, in a case where the cycle of the protrusion and recess shape of the moth eye structure is 100 nm or more, light having a wavelength of 380 nm is capable of recognizing the fine structural pattern, and the antireflection property is excellent, which is preferable. The presence or absence of the moth eye structure can be confirmed by observing the surface shape using a scanning electron microscope (SEM), an atomic force microscope (AFM), or the like and investigating whether or not the fine structural pattern is generated.

[Particles]

Particles are preferably particles having an average primary particle diameter of 100 nm or more and 380 nm or less. The particles having an average primary particle diameter of 100 nm or more and 380 nm or less will also be referred to as "the particles (a)".

As the particles (a), metal oxide particles, resin particles, organic hybrid particles having a metal oxide particle as the core and a resin as the shell, and the like are exemplified, and metal oxide particles are preferred from the viewpoint of the excellent film strength.

As the metal oxide particles, silica particles, titania particles, zirconia particles, antimony pentaoxide particles, and the like are exemplified, and silica particles are preferred since the silica particles have a refractive index that is similar to those of a number of binders, which suppresses the generation of haze, and easily form the moth eye structure.

As the resin particles, polymethyl methacrylate particles, polystyrene particles, melamine particles, and the like are exemplified.

The average primary particle diameter of the particles (a) is 100 nm or more and 380 nm or less, preferably 100 nm or more and 300 nm or less, more preferably 150 nm or more and 250 nm or less, and still more preferably 170 nm or more and 220 nm or less since the particles can be arranged to form the moth eye structure.

Only one kind of the particles (a) may be used or two or more kinds of particles having different average primary particle diameters may also be used.

The average primary particle of the particles (a) refers to the cumulative 50% particle diameter of the volume-average particle diameter. In the measurement of the particle diameters, a scanning electron microscope (SEM) can be used. Powder particles (in the case of a dispersion liquid, particles obtained by drying the dispersion liquid to volatilize the solvent) are observed using SEM at an appropriate magnification (approximately 5,000 times), the diameters of 100 primary particles are respectively measured, the volumes thereof are computed, and the cumulative 50% particle diameter can be regarded as the average primary particle diameter. In a case where the particle is not spherical, the average value of the long diameter and the short diameter is regarded as the diameter of the primary particle. In the case of measuring particles that are included in an antireflection film, the particles are observed and computed in the same manner as described above using SEM from the surface side. At this time, carbon deposition, an etching treatment, or the like may be appropriately carried out on the specimen in order to facilitate observation.

The shape of the particle (a) is most preferably a spherical shape, but may also be a shape other than a spherical shape such as an irregular shape.

In addition, the silica particles may be crystalline or amorphous.

As the particles (a), surface-treated inorganic fine particles are preferably used in order to improve the dispersibility in a coating fluid, improve the film strength, and prevent agglomeration. A specific example and a preferred example of a method for the surface treatment are identical to those described in <0119> to <0147> of JP2007-298974A.

Particularly, from the viewpoint of imparting a binding property with a curable compound that is a binder component and improving the film strength, it is preferable to modify the surfaces of the particles with a compound having a unsaturated double bond and a functional group having reactivity with the surfaces of the particles and impart the unsaturated double bond to the surfaces of the particles. As the compound that is used for surface modification, a silane coupling agent having a polymerizable functional group can be preferably used.

As specific examples of the particles having an average primary particle diameter of 100 nm or more and 380 nm or less, it is possible to preferably use SEAHOSTAR KE-P10 (average primary particle diameter: 100 nm, amorphous silica manufactured by Nippon Shokubai Co., Ltd.). SEAHOSTAR KE-P20 (average primary particle diameter: 200 nm, amorphous silica manufactured by Nippon Shokubai Co., Ltd.), SEAHOSTAR KE-P30 (average primary particle diameter: 300 nm, amorphous silica manufactured by Nippon Shokubai Co., Ltd.), SEAHOSTAR KE-S30 (average primary particle diameter: 300 nm, heat resistance: 1,000° C., silica manufactured by Nippon Shokubai Co., Ltd.), EPOSTAR S (average primary particle diameter: 200 nm, melamine-formaldehyde condensate manufactured by Nippon Shokubai Co., Ltd.), EPOSTAR MA-MX100W (average primary particle diameter: 175 nm, polymethyl methacrylate (PMMA)-based crosslinking agent manufactured by Nippon Shokubai Co., Ltd.), EPOSTAR MA-MX200W (average primary particle diameter: 350 nm, polymethyl methacrylate (PMMA)-based crosslinking agent manufactured by Nippon Shokubai Co., Ltd.), STAFYROID (multilayer structure organic fine particles manufactured by Aica Kogyo Co., Ltd.), GANZ PARU (polymethyl methacrylate, polystyrene particles manufactured by Aica Kogyo Co., Ltd.), and the like.

As the particles (a), fired silica particles are particularly preferred since the fired silica particles have an appropriately large amount of a hydroxyl group on the surface and are hard particles.

The fired silica particles can be manufactured using a well-known technique in which a hydrolysable silicon compound is hydrolyzed and condensed in an organic solvent including water and a catalyst to obtain silica particles and the silica particles are fired, and it is possible to refer to, for example, JP2003-176121A, JP2008-137854A, and the like.

The silicon compound as a raw material for manufacturing the fired silica particles is not particularly limited, and chlorosilane compounds such as tetrachlorosilane, methyltrichlorosilane, phenyltrichlorosilane, dimethyldichlorosilane, diphenyldichlorosilane, methylvinyldichlorosilane, trimethylchlorosilane, and methyldiphenylchlorosilane; alkoxysilane compounds such as tetramethoxysilane, tetraethoxysilane, tetraisopropoxysilane, tetrabutoxysilane, methyltrimethoxysilane, methyltriethoxysilane, trimethoxyvinylsilane, triethoxyvinylsilane, 3-glycidoxypropyltrimethoxysilane, 3-chloropropyltrimethoxysilane, 3-mercaptopropyltrimethoxysilane, 3-(2-aminoethylamino) propyltrimethoxy silane, phenyltrimethoxysilane, phenyltriethoxysilane, dimethyldimethoxysilane, dimethyldiethoxysilane, 3-glycidoxypropylmethyldimethoxysilane, 3-glycidoxypropylmethyldiethoxysilane, 3-chloropropylmethyldimethoxysilane, diphenyldimethoxysilane, diphenyldiethoxysilane, dimethoxydiethoxysilane, trimethylmethoxysilane, and trimethylethoxysilane; acyloxysilane compounds such as tetraacetoxysilane, methyltriacetoxysilane, phenyltriacetoxysilane, dimethyldiacetoxysilane, diphenyldiacetoxysilane, and trimethylacetoxysilane; silanol compounds such as dimethylsilanediol, diphenylsilanediol, and trimethylsilanol; and the like are exemplified. Among the above-described exemplary silane compounds, the alkoxysilane compound is particularly preferred since the alkoxysilane compound is easily procured and a halogen atom is not included in fired silica particles to be obtained as an impurity. As a preferred form of the fired silica particles according to the present invention, silica particles in which the content of a halogen atom is substantially 0% and from which no halogen atom is detected are preferred.

The firing temperature is not particularly limited, but is preferably 800° C. to 1, 300° C. and more preferably 1,000° C. to 1, 200° C.

The amount of the particles (a) provided by application is preferably 50 mg/m² to 200 mg/m², more preferably 100 mg/m² to 180 mg/m², and most preferably 130 mg/m² to 170 mg/m². At an amount of the particles (a) provided by application that is equal to or more than the lower limit, a number of protrusion portions of the moth eye structure can be formed, and thus it is easy to further improve the antireflection property, and, at an amount of the particles (a) provided by application that is equal to or less than the upper limit, agglomeration in a liquid does not easily occur, and it is easy to form a favorable moth eye structure.

The fluorine-containing copolymer preferably contains only one kind of monodisperse silica fine particles having an average primary particle diameter of the particles of 100 nm or more and 380 nm or less and a CV value of less than 5% since the heights of protrusions and recesses of the moth eye structure become uniform, and the reflectivity further decreases. The CV value is generally measured using a laser diffraction-type particle diameter measurement instrument, but a different particle diameter measurement method may also be used, and it is also possible to compute the CV value by obtaining a particle diameter distribution from a surface SEM image of an antireflection layer of the present invention by means of an image analysis. The CV value is more preferably less than 4%.

[Base Material]

The optical film of the embodiment of the present invention preferably has a film formed of the composition for forming a film on a base material.

As the base material, a transparent base material having an average transmittance of visible light (wavelength: 400 to 800 nm) of 80% or more is preferred, and a glass or polymer film can be used. Examples of a material of the polymer film that is used as the base material include cellulose acylate films (for example, cellulose triacetate films, cellulose diacetate films, cellulose acetate butyrate films, and cellulose acetate propionate films), polyolefins such as polyethylene and polypropylene, polyester-based resin films such as polyethylene terephthalate and polyethylene naphthalate, polyether sulfone films, polyacrylic resin films such as polymethyl methacrylate, polyurethane-based resin films, polyester films, polycarbonate films, polysulfone films, polyether films, polymethylpentene films, polyetherketone films, (meth)acrylonitrile films, polyolefins, polymers having an alicyclic structure (norbornene-based resins (ARTON: trade name, manufactured by JSR Corporation, amorphous polyolefins (ZEONEX: trade name, manufactured by Zeon Corporation)), and the like. Among these, cellulose acylate films are preferred.

The film thickness of the base material may be approximately 1 μm to 1,000 μm, but is preferably 1 μm to 100 μm and more preferably 1 μm to 25 μm since it is preferable to reduce the thickness for mobile uses.

[Method for Manufacturing Optical Film]

The optical film of the embodiment of the present invention can be manufactured by applying the composition for forming a film onto the base material, and drying and curing the composition.

<Coating Methods>

Individual layers in the optical film of the embodiment of the present invention can be formed using the following coating methods, but the method is not limited thereto. Well-known methods such as a dip coating method, an air knife coating method, a curtain coating method, a roller coating method, a wire bar coating method, a gravure coating method, a slide coating method, an extrusion coating method (die coating method) (refer to the specification of JP2003-164788A), and a micro-gravure coating method can be used, and, among these, a micro-gravure coating method and a die coating method are preferred.

<Drying and Curing Conditions>

Regarding drying and curing methods at the time of forming a film by applying the composition for forming a film of the embodiment of the present invention, preferred examples will be described below.

In the present invention, it is effective to cure the composition by means of a combination of irradiation with ionizing radiation and a thermal treatment carried out before, at the same time, or after the irradiation.

Hereinafter, several patterns of manufacturing steps will be described, but the manufacturing steps are not limited thereto. (Reference sign "-" below indicates that no thermal treatment is carried out.)

Before irradiation→at the same time as irradiation→after irradiation
(1) Thermal treatment→ionizing radiation curing→-
(2) Thermal treatment→ionizing radiation curing→thermal treatment
(3) -→ionizing radiation curing→thermal treatment Additionally, a step of carrying out a thermal treatment at the same time at the time of ionizing radiation curing is also preferred.

In the present invention, as described above, a thermal treatment is preferably carried out in combination with irradiation with ionizing radiation. The thermal treatment is not particularly limited as long as the thermal treatment does not impair constituent layers including the base material in the optical film and the film containing the fluorine-containing copolymer of the embodiment of the present invention, but is preferably carried out at 40° C. to 150° C. and more preferably carried out at 40° C. to 80° C.

The time necessary for the thermal treatment varies depending on the molecular weights, interactions with other components, viscosities, and the like of components used, but is 15 seconds to 1 hour, preferably 20 seconds to 30 minutes, and most preferably 30 seconds to 5 minutes.

The kind of ionizing radiation is not particularly limited, examples thereof include X-rays, electron beams, ultraviolet rays, visible light, infrared rays, and the like, and ultraviolet rays are widely used. For example, in a case where coated films are ultraviolet-curable, individual layers are preferably cured by being irradiated with ultraviolet rays at an irradiance level of 10 mJ/cm$^2$ to 1,000 mJ/cm$^2$ using an ultraviolet lamp. During irradiation, layers can be irradiated by striking the energy collectively or separately. Particularly, from the viewpoint of decreasing performance variation in the planes of coated films or improving curling, layers are preferably irradiated separately twice or more and preferably irradiated at a low irradiance level of 150 mJ/cm$^2$ or less in the initial phase, then, irradiated with ultraviolet rays at a high irradiance level of 50 mJ/cm$^2$ or more, and irradiated at a higher irradiance level in the later phase than in the initial phase. From the viewpoint of hardness, the total irradiance level is preferably 100 mJ/cm$^2$ to 1,000 mJ/cm$^2$, more preferably 300 mJ/cm$^2$ to 1,000 mJ/cm$^2$, and most preferably 500 mJ/cm$^2$ to 1,000 mJ/cm$^2$.

<Polarizing Plate>

The optical film of the embodiment of the present invention can be used as, for example, a polarizing plate protective film.

A polarizing plate in which the optical film of the embodiment of the present invention is used as a polarizing plate protective film will be described.

The polarizing plate preferably has at least one optical film of the embodiment of the present invention and preferably includes the optical film of the embodiment of the present invention which is attached to the polarizer after a saponification treatment. A method for producing the polarizing plate is not particularly limited, and the polarizing plate can be produced using an ordinary method.

[Image Display Device]

The optical film of the embodiment of the present invention can also be applied to an image display device.

As the image display device, a display device in which a cathode-ray tube (CRT) is used, a plasma display panel (PDP), an electroluminescence display (ELD), a vacuum fluorescent display (VFD), a field emission display (FED), and a liquid crystal display (LCD) can be exemplified, and a liquid crystal display device is particularly preferred.

Generally, the liquid crystal display device has a liquid crystal cell and two polarizing plates disposed on both sides of the liquid crystal cell, and the liquid crystal cell supports a liquid crystal between two electrode substrates. Furthermore, an optical anisotropic layer is disposed between the liquid crystal cell and one polarizing plate or two optical anisotropic layers are disposed between the liquid crystal cell and both polarizing plates. As the liquid crystal cell, it is possible to apply liquid crystal cells having a variety of driving methods such as a twisted nematic (TN) mode, a vertically aligned (VA) mode, an optically compensatory bend (OCB) mode, and an in-plane switching (IPS) mode.

EXAMPLES

Hereinafter, the present invention will be more specifically described using examples. Materials, reagents, amounts and fractions of substances, operations, and the like described in the following examples can be appropriately changed within the scope of the gist of the present invention. Therefore, the scope of the present invention is not limited to the following examples.

(Synthesis of Monomer 1)

2,4,4,5,7,7,8,10,10,11,13,13,14,16,16,17,17,18,18,18-Icosafluoro-2,5,8,11,14-pentakis(trifluoromethyl)-3,6,9,12,15-pentaoxaoctadecan-1-ol (15.0 g, 31.1 mmol), triethylamine (4.09 g, 40.45 mol), and acetonitrile (20 g) were put into a 300 mL three-neck flask to which an ice bath, a stirrer, a temperature sensor, and a cooling pipe were attached and cooled to 15° C. or lower. A solution of methacrylic acid chloride (4.23 g, 40.45 mmol) and acetonitrile (10 g) was added dropwise for 30 minutes and then stirred at room temperature (25° C.) for five hours. The obtained red solution was separated with a 2 mol/L hydrochloric acid aqueous solution and then purified by being separated with pure water three times. The obtained solution was dried, and the solvent was distilled away, thereby obtaining a monomer 1 (14.10 g).

(Synthesis of Monomer 2)

2-Hydroxyethyl methacrylate (22.55 g, 172 mmol), triethylamine (20.9 g, 207 mmol), and acetonitrile (80 g) were put into a 300 mL three-neck flask to which an ice bath, a stirrer, a temperature sensor, and a cooling pipe were attached and cooled to 15° C. or lower. A hexafluoropropene trimer (92.6 g, 224 mmol) was added dropwise for one hour and then the components were stirred at room temperature for three hours. The obtained solution was separated with a 2 mol/L hydrochloric acid aqueous solution and then purified by being separated with pure water three times. The obtained solution was dried, and the solvent was distilled away, thereby obtaining a monomer 2 (83.61 g).

(Synthesis of Fluorine-Containing Copolymer B-1)

—Synthesis of Precursor b-1—

Methyl ethyl ketone (MEK) (15.0 g) was put into a 300 mL three-neck flask to which a stirrer, an oil bath, a cooling pipe, and a nitrogen introduction pipe were attached and heated to 80° C. A mixed solution including the monomer 1 (13.31 g, 24.2 mmol), the monomer 3 (13.69 g, 48.5 mmol), a polymerization initiator V-601 (manufactured by Pure Wako Chemical Industries, Ltd.) (0.94 g, 4.1 mmol), and MEK (13.5 g) was added dropwise thereto for three hours under a nitrogen flow (20 mL/min). After stirred for one hour, the components were heated to 90° C. and aged for three hours.

—Synthesis of Fluorine-Containing Copolymer B-1—

Diazabicycloundecene (DBU) (22.3 g), 4-methoxyphenyl (MEHQ) (10 mg), and ethyl acetate (30.0 g) were added to a solution of the precursor b-1 and stirred at room temperature for one night. The obtained solution was filtered and then separated with a 2.0 mol/L hydrochloric acid aqueous solution. Furthermore, the solution was separated with water three times, thereby obtaining a solution of a fluorine-containing copolymer B-1.

The weight-average molecular weight (Mw) of the obtained fluorine-containing copolymer was 15,800. In addition, the structure of the fluorine-containing copolymer was identified by 1H-NMR (nuclear magnetic resonance) (heavy chloroform solvent, 400 MHz), and it was confirmed from the peak areas of 5.6 ppm and 6.2 ppm that a cross-linking group was quantitatively introduced to the polymer. From the fact that the peak shape of GPC was monomodal and there were no turbidity and undissolved components in the solution of the fluorine-containing polymer B-1, it was confirmed that a side reaction such as gelation did not occur.

Fluorine-containing copolymers B-2, B-3, B-4, B-5. B-6, B-7, B-8, B-10, B-12, B-15, B-16, B-19, B-20, B-22, B-23, B-26, B-27, B-28, B-35, B-36, and B-37 were synthesized in the same manner as described above.

(Synthesis of Fluorine-Containing Copolymer B-31)

—Synthesis of Precursor b-3—

Methyl ethyl ketone (MEK) (15.0 g) was put into a 300 mL three-neck flask to which a stirrer, an oil bath, a cooling pipe, and a nitrogen introduction pipe were attached and heated to 80° C. A mixed solution including the monomer 1 (13.31 g, 24.2 mmol), glycidyl methacrylate (6.89 g, 48.5 mmol), a polymerization initiator V-601 (manufactured by Pure Wako Chemical Industries, Ltd.) (0.94 g, 4.1 mmol), and MEK (13.5 g) was added dropwise thereto for three hours under a nitrogen flow (20 mL/min). After stirred for one hour, the components were heated to 90° C. and aged for three hours.

—Synthesis of Fluorine-Containing Copolymer B-31—

2-Carboxyethyl acrylate (8.38 g, 58.2 mmol), 4-methoxyphenyl (MEHQ) (10 mg), tetrabutylammonium bromide (80 mg), and ethyl acetate (30.0 g) were added to a solution of the precursor b-31 and stirred at 30° C. for four hours. The obtained solution was filtered and then separated with a NaCl aqueous solution. Furthermore, the solution was separated with water three times, thereby obtaining a solution of a fluorine-containing copolymer B-31.

The weight-average molecular weight (Mw) of the obtained fluorine-containing copolymer was 14,500.

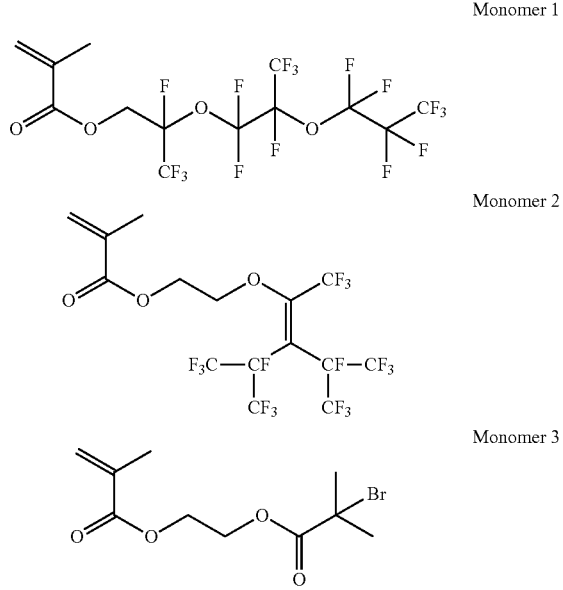

<Preparation of Coating Fluid for Forming Antireflection Layer 1>

Individual components were mixed together so as to obtain the following composition, thereby producing a coating fluid for forming an antireflection layer 1 (composition for forming a film).

(Preparation of Silica Particle Dispersion Liquid)

KE-P20 (SEAHOSTAR KE-P20 manufactured by Nippon Shokubai Co., Ltd.) was fired at 1,050° C. for one hour using an electric furnace, then, cooled, and subsequently crushed using a crusher. The fired KE-P20 (5 kg) was prepared in a Henschel mixer (FM20J type manufactured by Nippon Coke & Engineering. Co., Ltd.) having a capacity of 20 L and a heating jacket. A solution obtained by dissolving 3-acryloxypropyltrimethoxysilane (KBM5103 manufactured by Shin-Etsu Chemical Co., Ltd.) (45 g) in methyl alcohol (90 g) was added dropwise to and mixed with the fired KE-P20 under stirring. After that, in a heating treatment in which the heating treatment was carried out by heating the mixture up to 150° C. for approximately one hour under mixing and stirring and holding the mixture at 150° C. for 12 hours, a substance attached to the wall surface was scraped by rotating a scraper in a direction opposite to that of stirring blades at all times. In addition, the substance attached to the wall surface was also appropriately scraped using a spatula. The substance was heated, then, cooled, and crushed and classified using a jet crushing and classification machine, thereby obtaining silica particles surface-treated with a silane coupling agent. An acryloyl group was attached to the surfaces of the silica particles.

MEK (80 parts by mass) and the silica particles (20 parts by mass) were injected into a mixing tank, stirred for 10 hours, and then ultrasonically dispersed for 30 minutes while being continuously stirred, thereby preparing a silica particle dispersion liquid having a solid content concentration of 20% by mass.

The average primary particle diameter of the silica particles that were included in the silica particle dispersion liquid was 180 nm.

| Composition of coating fluid for forming antireflection layer 1 | |
| --- | --- |
| Silica particle dispersion liquid | 400 parts by mass |
| Fluorine-containing copolymer B-1 | 1 part by mass |
| STRIUS501 | 70 parts by mass |
| IRGACURE 127 | 4 parts by mass |
| MEK | 1,000 parts by mass |

SIRIUS501: Dendrimer-type polyfunctional acrylate (manufactured by Osaka Organic Chemical Industry Ltd.)

IRGACURE 127 (Irg127): Light polymerization initiator (manufactured by BASF)

MEK: Methyl ethyl ketone

<Preparation of Coating Fluids for Forming Antireflection Layer 2 to 27>

Coating fluids for forming an antireflection layer 2 to 27 were produced in the same manner as described above except for the fact that the fluorine-containing copolymer B-1 was changed to compounds shown in Table 1.

(Production of Hardcoat Layer-Attached Base Material)

<Formation of Hardcoat Layer>

A coating fluid for forming a hardcoat layer having the following composition was applied onto a FUJITAC TG60UL (manufactured by Fujifilm Corporation, cellulose triacetate film) and cured by being irradiated with ultraviolet rays at an irradiation amount of 20 mJ/cm$^2$ using an air-cooling metal halide lamp while carrying out nitrogen purging so as to adjust the concentration of oxygen to 1.0% by volume, thereby forming a hardcoat layer having a film thickness of 8 μm. A hardcoat layer-attached base material was produced as described above.

| (Composition of coating fluid for forming hardcoat layer) | |
| --- | --- |
| UNIDIC 17-806 | 55.8 parts by mass |
| IRGACURE 127 | 1.9 parts by mass |
| Methyl ethyl ketone | 24.5 parts by mass |
| Methyl isobutyl ketone | 8.9 parts by mass |
| Methyl acetate | 8.9 parts by mass |

UNIDIC 17-806: Urethane acrylate (manufactured by DIC Corporation, solid content 80% solution)

[Step (1) Application of Coating Fluid for Forming Antireflection Layer]

Each of the coating fluids for forming an antireflection layer was applied in 2.8 ml/m$^2$ onto the hardcoat layer of the hardcoat layer-attached base material using a bar coater and dried at room temperature for 90 seconds.

A part of a sample was cut out, cured by being irradiated at 600 mJ/cm$^2$ using an air-cooling metal halide lamp, and then cut using a microtome, thereby exposing a cross section. The cross section was observed using SEM at a magnification of 5.000 times, and the thickness of a resin with respect to particles was measured.

[Step (2)]

The sample was irradiated using an air-cooling metal halide lamp from the surface side onto which the coating fluid for forming an antireflection layer had been applied at 2.0 mJ/cm$^2$ in an environment of an oxygen concentration of 1.0%, thereby producing a sample of a curing percentage of 6%.

As the air-cooling metal halide lamp, M04-L41 manufactured by Eye Graphics Co., Ltd. was used.

The irradiation amount was measured by attaching HEAD SENSER PD-365 to EYE cumulative UV irradiation intensity tester UV METER UVPF-A1 manufactured by Eye Graphics Co., Ltd. and carrying out measurement at a measurement range of 0.0.

(Oil Application)

Oil liquids having the following composition (all silicone oils manufactured by Shin-Etsu Chemical Co., Ltd.) were applied onto an antireflection layer using a die coater so that the thickness reached 600 nm.

| Composition of oil liquids | |
| --- | --- |
| KF96-10cs | 30.0 parts by mass |
| KF96-0.65cs | 70.0 parts by mass |

[Step (3)]

The oil-applied sample was treated at 120° C. for five minutes, and a part of a curable compound that was included in the antireflection layer was caused to intrude into the base material.

[Step (4)]

The curable compound in the antireflection layer was cured by being irradiated with 600 mJ/cm$^2$ of ultraviolet rays using the air-cooling metal halide lamp while carrying out nitrogen purging so that the oxygen concentration reached 0.01% by volume or less in the atmosphere, thereby producing a resin.

A part of a sample was cut out, cured by being irradiated at 600 mJ/cm$^2$ using an air-cooling metal halide lamp, and then cut using a microtome, thereby exposing a cross section. The cross section was observed using SEM at a magnification of 5,000 times, and the thickness of a resin with respect to particles (a portion in which no particles were present) was measured. In a case where the thickness of the resin decreased by 0.4 times or more the particle diameter compared with the SEM observation image after the step (1), it was determined that a part of the curable compound intruded in the step (2).

(Oil Removal)

The sample was immersed in methyl isobutyl ketone, and then the methyl isobutyl ketone was caused to naturally flow out, thereby removing the oil.

Optical films (test specimens) having the antireflection layer formed of each of the coating fluids for forming an antireflection layer 1 to 27 were produced as described above.

<Evaluation of Rub Resistance (Steel Wool (SW) Rubbing)>

Rubbing tests were carried out under the following conditions using a rubbing tester on the surfaces of the antireflection layers that had been formed of the coating fluids for forming an antireflection layer 1 to 27 in the optical films, thereby obtaining indexes of rub resistance.

Evaluation environment conditions: 25° C. relative humidity: 60%

Rubbing material: Steel wool (manufactured by Nihon Steel Wool Co. Ltd., No. 0000)

wound around a rubbing tip portion (1 cm×11 cm) of the tester that came into contact with the specimen and fixed using a band Migration distance (one way): 13 cm, Rubbing rate: 13 cm/second, Load: 200 g/cm$^2$, Contact area of tip portion: 1 cm×1 cm Number of times of rubbing: 10 reciprocations Black oil-based ink (manufactured by Teranishi Chemical Industry Co., Ltd., black ink for marker supplement) was applied onto the rear side (base material surface) of the rubbed specimen, visually observed using reflected light, and scratches in a rubbed portion was evaluated. Meanwhile, D or E is practically problematic levels.

A: The number of scratches is 0.
B: The number of scratches is 1 or 2.
C: The number of scratches is 3 to 5.
D: The number of scratches is 6 to 9.
E: The number of scratches is 10 or more.

<Evaluation of Antifouling Property (Fingerprint Wiping)>

Black oil-based ink was applied onto the rear side (base material surface) of the optical films, and a finger was pressed onto the antireflection layers formed of the coating fluid for forming an antireflection layer 1 to 27, thereby attaching a fingerprint thereto. The attached fingerprint was wiped ten time using tissue paper, and the remaining trace of the attached fingerprint was observed and evaluated. Meanwhile, D or E is practically problematic levels.

A: The attachment trace of the fingerprint is not observed.
B: The attachment trace of the fingerprint is slightly observed, but can be ignored.
C: The attachment trace of the fingerprint is observed and cannot be ignored.
D: The wiped trace of the fingerprint is clearly observed and cannot be ignored.
E: The fingerprint cannot be wiped.

The above-described results are shown in Table 1.

TABLE 1

| | Coating fluid for forming antireflection layer | Silica particle dispersion liquid Amount added (parts by mass) | Fluorine-containing copolymer Kind | Amount added (parts by mass) | Curable compound Kind | Amount added (parts by mass) | Polymerization initiator Kind | Amount added (parts by mass) | Solvent Kind | Amount added (parts by mass) | Evaluation results Rub resistance (SW rubbing) | Antifouling property fingerprint (wiping) |
|---|---|---|---|---|---|---|---|---|---|---|---|---|
| Example | Coating fluid 1 | 400 | B-1 | 1 | Sirins501 | 70 | Irg127 | 4 | MEK | 1000 | A | A |
| | Coating fluid 2 | 400 | B-2 | 1 | Sirins501 | 70 | Irg127 | 4 | MEK | 1000 | A | A |
| | Coating fluid 3 | 400 | B-3 | 1 | Sirins501 | 70 | Irg127 | 4 | MEK | 1000 | A | A |
| | Coating fluid 4 | 400 | B-4 | 1 | Sirius501 | 70 | Irg127 | 4 | MEK | 1000 | A | A |
| | Coating fluid 5 | 400 | B-5 | 1 | Sirius501 | 70 | Irg127 | 4 | MEK | 1000 | A | C |
| | Coating fluid 6 | 400 | B-6 | 1 | Sirius501 | 70 | Irg127 | 4 | MEK | 1000 | A | B |
| | Coating fluid 7 | 400 | B-7 | 1 | Sirius501 | 70 | Irg127 | 4 | MEK | 1000 | A | A |
| | Coating fluid 8 | 400 | B-8 | 1 | Sirius501 | 70 | Irg127 | 4 | MEK | 1000 | B | A |
| | Coating fluid 9 | 400 | B-10 | 1 | Sirius501 | 70 | Irg127 | 4 | MEK | 1000 | B | A |
| | Coating fluid 10 | 400 | B-12 | 1 | Sirius501 | 70 | Irg127 | 4 | MEK | 1000 | A | B |
| | Coating fluid 11 | 400 | B-15 | 1 | Sirius501 | 70 | Irg127 | 4 | MEK | 1000 | A | C |
| | Coating fluid 12 | 400 | B-16 | 1 | Sirius501 | 70 | Irg127 | 4 | MEK | 1000 | B | A |
| | Coating fluid 13 | 400 | B-19 | 1 | Sirins501 | 70 | Irg127 | 4 | MEK | 1000 | C | A |
| | Coating fluid 14 | 400 | B-20 | 1 | Sirius501 | 70 | Irg127 | 4 | MEK | 1000 | A | C |
| | Coating fluid 15 | 400 | B-22 | 1 | Sirius501 | 70 | Irg127 | 4 | MEK | 1000 | C | B |
| | Coating fluid 16 | 400 | B-23 | 1 | Sirius501 | 70 | Irg127 | 4 | MEK | 1000 | B | A |
| | Coating fluid 17 | 400 | B-26 | 1 | Sirius501 | 70 | Irg127 | 4 | MEK | 1000 | B | A |
| | Coating fluid 18 | 400 | B-27 | 1 | Sirius501 | 70 | Irg127 | 4 | MEK | 1000 | C | A |
| | Coating fluid 19 | 400 | B-28 | 1 | Sirius501 | 70 | Irg127 | 4 | MEK | 1000 | A | B |
| | Coating fluid 20 | 400 | B-31 | 1 | Sirius501 | 70 | Irg127 | 4 | MEK | 1000 | C | A |
| | Coating fluid 21 | 400 | B-35 | 1 | Sirius501 | 70 | Irg127 | 4 | MEK | 1000 | B | C |
| | Coating fluid 22 | 400 | B-36 | 1 | Sirius501 | 70 | Irg127 | 4 | MEK | 1000 | C | A |
| Comparative Example | Coating flmd 23 | 400 | B-37 | 1 | Sirius501 | 70 | Irg127 | 4 | MEK | 1000 | A | C |
| | Coating fluid 24 | 400 | H-1 | 1 | Sirius501 | 70 | Irg127 | 4 | MEK | 1000 | A | D |
| | Coating fluid 25 | 400 | H-2 | 1 | Sirius501 | 70 | Irg127 | 4 | MEK | 1000 | D | C |
| | Coating fluid 26 | 400 | H-3 | 1 | Sirius501 | 70 | Irg127 | 4 | MEK | 1000 | D | A |
| | Coating fluid 27 | 400 | H-4 | 1 | Sirins501 | 70 | Irg127 | 4 | MEK | 1000 | E | E |

(H-1) (Copolymer having a fluorine group having a linear structure)

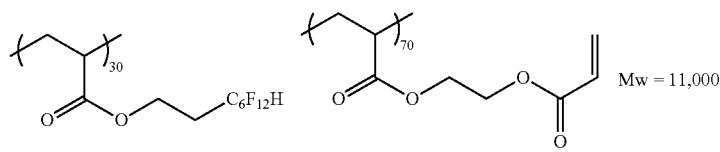

$Mw = 11{,}000$ (H-2) (Compound that is used in Example 1 of JP2014-167081A)

TABLE 1-continued

| Coating fluid for forming antireflection layer | Silica particle dispersion liquid Amount added (parts by mass) | Fluorine-containing copolymer | | Curable compound | | Polymerization initiator | | Solvent | | Evaluation results | |
|---|---|---|---|---|---|---|---|---|---|---|---|
| | | Kind | Amount added (parts by mass) | Kind | Amount added (parts by mass) | Kind | Amount added (parts by mass) | Kind | Amount added (parts by mass) | Rub resistance (SW rubbing) | Antifouling property fingerprint (wiping) |

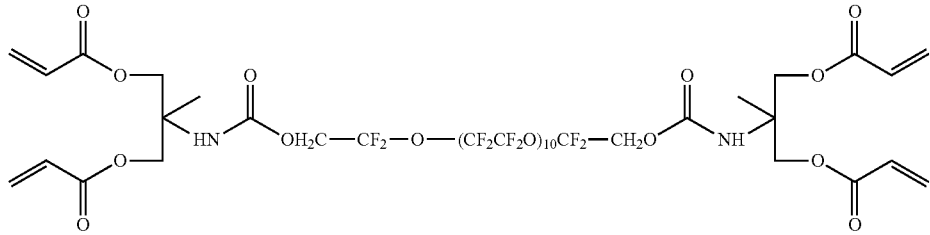

(H-3) (Compound that is used in Example 1 of JP2017-008128A)

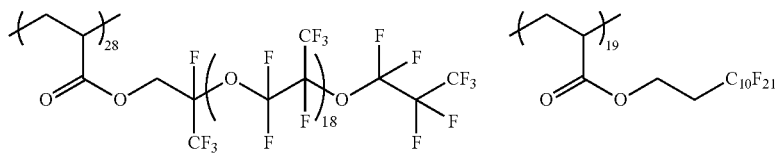

Mw = 27,000

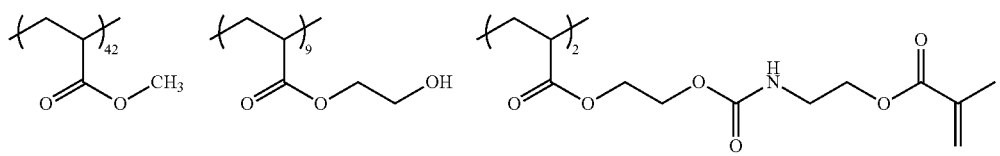

(H-4) KY-108: Commercially available fluorine-based polymer (manufactured by Shin-Etsu Chemical Co., Ltd.)

What is claimed is:

1. A fluorine-containing copolymer comprising:
a repeating unit represented by General Formula (I); and
a repeating unit represented by General Formula (II),

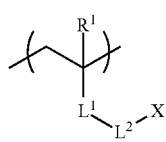 (I)

in General Formula (I), $R^1$ represents a hydrogen atom or an alkyl group having 1 to 20 carbon atoms, $L^1$ represents a divalent linking group including at least one selected from the group consisting of —O—, —(C=O)O—, —O(C=O)—, —(C=O)—NH—, —NH—(C=O)—, a divalent aromatic group, or a divalent alicyclic group, $L^2$ represents a single bond or a divalent linking group, and X is represented by General Formula (III) or General Formula (IV),

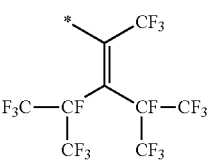 (III)

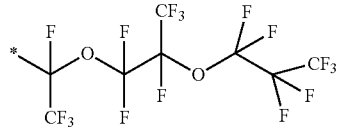 (IV)

in General Formulae (III) and (IV), * represents a bonding site to $L^2$ in General Formula (I),

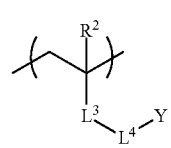 (II)

in General Formula (II), $R^2$ represents a hydrogen atom or an alkyl group having 1 to 20 carbon atoms, $L^3$ represents a divalent linking group including at least one selected from the group consisting of —O—, —(C=O)O—, —O(C=O)—, —(C=O)—NH—, —NH—(C=O)—, a divalent aromatic group, or a divalent alicyclic group, $L^4$ represents a single bond, an alkylene group having 1 to 20 carbon atoms, an alkenylene group having 1 to 20 carbon atoms, a divalent aromatic group, —O—, —(C=O)O—, —O(C=O)—, —(C=O)—NH—, —NH—(C=O)—, or a divalent linking group consisting of a combination of the above-described bond or groups; however, $L^4$ does not represent a linking group including —O(C=O)—NH—, and Y is an acryloyloxy group, a methacryloyloxy group, or an acryloylamino group, wherein a weight average molecular weight is 1,000 to 100,000.

2. The fluorine-containing copolymer according to claim 1, wherein $L^1$ in General Formula (I) and $L^3$ in General Formula (II) each are represented by any of —(C=O)O—, —O(C=O)—, and —(C=O)—NH—.

3. A composition for forming a film comprising:
the fluorine-containing copolymer according to claim 1.

4. The composition for forming a film according to claim 3, further comprising:
a curable compound having a plurality of crosslinking groups in a molecule.

5. The composition for forming a film according to claim 3, further comprising:
particles.

6. An optical film comprising:
a film that is formed of the composition for forming a film according to claim 3.

7. An optical film comprising:
a film that is formed of the composition for forming a film according to claim 5,
wherein the optical film has a protrusion and recess structure on a surface.

* * * * *